United States Patent [19]

McGinniss

[11] 3,717,558
[45] Feb. 20, 1973

[54] PHOTOPOLYMERIZATION CATALYST COMPRISING A METALLOCENE AND AN ACTIVE HALOGEN-CONTAINING COMPOUND

[75] Inventor: Vincent D. McGinniss, Middleberg Heights, Ohio

[73] Assignee: SCM Corporation, Cleveland, Ohio

[22] Filed: March 30, 1971

[21] Appl. No.: 239,709

[52] U.S. Cl. .........204/159.15, 96/115 P, 117/93.31, 204/159.24, 260/868, 260/870
[51] Int. Cl. ..............................B01j 1/10, B01j 1/12
[58] Field of Search ....204/159.24, 159.15; 96/115 P

[56] References Cited

UNITED STATES PATENTS 3,454,538  7/1969  Naarman............................260/78.5

OTHER PUBLICATIONS

Tsubakiyama et al., Photosensitized Initiation of Vinyl Polymerization by a System of Ferrocene and Carbon Tetrachloride, Polymer Letters, Vol. 10, pp. 341–344 (1972)

*Primary Examiner*—Samuel H. Blech
*Assistant Examiner*—Richard B. Turer
*Attorney*—Merton H. Douthitt et al.

[57] ABSTRACT

Photosensitive catalyst compositions comprising a minor amount of a metallocene compound selected from the group consisting of Group I$b$, II$b$, IV$b$, V$b$, VI$b$, VII$b$, and VIII$b$ metals having an atomic number of 22–27, excluding 26 as set forth in the Periodic Chart of the Elements and an activated halogenated compound selected from the group consisting of a halosulfonyl compound, an $\alpha,\beta$-halo-substituted naphthalene, an allylic activated halogenated compound, and an acyl activated halogenated compound and a process for polymerizing vinyl monomers by subjecting a mixture of said photosensitive catalyst and vinyl monomer to ultraviolet light are set forth.

23 Claims, No Drawings

PHOTOPOLYMERIZATION CATALYST COMPRISING A METALLOCENE AND AN ACTIVE HALOGEN-CONTAINING COMPOUND

Photopolymerization of activated vinyl monomers by irradiating a vinyl monomer with a beam of wave energy; e.g., ultraviolet light, has been practiced for some time. With the availability of synthetic sources of ultraviolet light; e.g., electric lamps as opposed to sunlight, the interest in photopolymerization of vinyl monomers has grown.

There are several advantages of effecting polymerization of vinyl monomers by the mechanism of photopolymerization. One particular advantage is that 100 percent monomer systems are employed, as little to no solvent is necessary. On the other hand, heat curing systems often employ volatile solvents, etc. which are vented to the atmosphere during cure. Environmentalists have objected to these coating systems as causing unnecessary air pollution. Secondly, coating of articles which are heat-sensitive can be accomplished via photopolymerization at low temperatures; but not where heating is required to effect cure. Thirdly, polymerization times are relatively short and provide for rapid coating and curing and, as a result, find application for can coatings, wall board finishes, laminates, floor tiles, etc.

Typically, in carrying out photopolymerization, a vinyl monomer is contacted and mixed with a minor proportion of a photosensitive catalyst. When the mixture is subjected to ultraviolet light, free radicals are produced which then aid in effecting polymerization of the vinyl monomer.

One type of catalyst or photoinitiator system that has been used heretofore for photopolymerization work are the halosulfonyl compounds; e.g., sulfonyl chlorides, such as benzene sulfonyl chloride, toluene sulfonyl chloride, etc. Another halogen-providing compound employed for effecting photopolymerization of vinyl monomers is α-chloromethyl naphthalene.

Other types of systems for photopolymerization include the mercaptans; e.g., phenyl mercaptan; metal sulfides; e.g., zinc, and cadmium sulfide, and polynuclear quinones; e.g., anthraquinones and derivatives thereof.

Ferrocene (dicyclopentadienyl iron), has been used in the past to make light-sensitive systems for photoimaging. In that use, ferrocene is combined with a halogenated hydrocarbon; e.g., tetrabromomethane or aryl amine for reproduction. This composition, however, had not been employed as a catalyst for photoinitiation. Moreover, it is inoperable because the bromine atoms of tetrabromomethane are not activated.

A type of catalyst which has been recently used for chemical initiation of vinyl monomers and polymerization thereof, are the metal pi olefin complexes. Examples of such complexes are: dicyclopentadienyl zinc, dicyclopentadienyl titanium dichloride, dicyclopentadienyl vanadium, etc.

Most surprisingly, it has been found that a minor amount of a metallocene compound of a Group I$b$, II$b$, IV$b$, V$b$, VI$b$, VII$b$, VIIIb metal and having an atomic number of 22-27, excluding 26 in combination with an activated halogenated compound selected from the group consisting of a halosulfonyl compound, an α,β- halosubstituted naphthalene, an allylic activated halogenated compound, and an α-acyl activated halogenated compound synergistically affects the activated halogenated compound, thereby enhancing its effectiveness as a photopolymerization catalyst for the curing of activated vinyl monomers with ultraviolet light.

A minor amount of a metallocene compound as later described when contacted with an activated halogenated compound induces a reaction therewith and such reaction results in an apparent physical change of the resulting mixture. On mixing, the color of the mixture turns, usually to a greenish-black; at least this is true for many of the metallocene compounds. On the other hand, dicyclopentadienyl chromium turns to a reddish-blackish color as opposed to a greenish-blackish color. The evidence of a reaction as having taken place also is manifested in that an ultraviolet spectragraph of the mixture shows peaks not seen in either of the components taken individually. It appears that this reaction accounts for the effectiveness as the rate of polymerization of vinyl monomers catalyzed with such mixture is substantially faster than a mixture catalyzed with an equal amount of either the activated halogenated compound or the metallocene compound.

Advantages of this catalyst system include: the ability to polymerize vinyl monomer samples at faster rates than are obtainable on using the individual components singularly; the ability to polymerize films of vinyl monomers having a thickness of about 2 mils at a rate of at least 300 feet per minute and often up to 600 feet per minute even in the presence of air; and the ability to produce a product having little or no discoloration even though a small percentage of the catalyst is metal.

By a "metallocene compound" it is meant to refer to the pi olefin complexes formed with the transition metals set forth in Groups I$b$, II$b$, IV$b$, V$b$, VI, VII$b$, and VIII$b$ having an atomic number of between 22 and 79, excluding 26 as set forth in the Periodic Chart of the Elements.

Probably the most common metallocene compounds are the dicyclopentadienyl metal compounds wherein the metal is sandwiched between two cyclopentadiene rings. Ferrocene which is dicyclopentadienyl iron, typifies this type of sandwich structure. Likewise, ferrocene and activated halogen compounds are photosensitive and this concept is described in my copending application having U. S. Ser. No. (1970 Series) 211,731 and a filing date of Dec. 23, 1971.

The classes of metal pi olefin compounds of this invention are represented by the formulas:

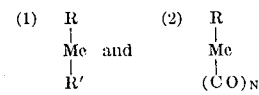

wherein Me is a transition metal as set forth in Groups I$b$, II$b$, IV$b$, V$b$, VI$b$, VII$b$, VIII$b$ and having an atomic number of between 27 and 79; R is an olefin having conjugated unsaturation and from four to 10 carbon atoms in the structure and R$^1$ is an olefin as defined by R and N is a number from one to four to satisfy available valence bonds.

The metals (Me) for forming metallocene compounds are the transition metals having an atomic number of at least 22 and a number not exceeding 79, excluding 26. These are characteristic of the metals in Groups Ib, IIb, IVb, Vb, VIb, VIIb, VIIIb elements. Examples of metals suitable for making the pi olefin complex include: cobalt, rhodium, iridium, nickel, palladium, platinum, copper, silver, gold, zinc, cadmium, mercury, ruthenium, osmium, titanium, zirconium, hafnium, vanadium, niobium, tantalum, chromium, molybdenum, manganese, rhenium, and technetium. For reasons of efficiency and economy, the preferred metals for forming pi olefin complexes and synergizing the activated halogenated compound are cobalt, nickel, chromium, manganese, and titanium.

The olefins designated R and R' in formula 1 and R in formula 2 are those having from four to 10 carbon atoms and at least conjugated unsaturation. Those contemplated by the formula can be aliphatic, cyclic; e.g., aromatic, or cycloaliphatic. Such olefins should have at least four carbon atoms as conjugation of ethylenically unsaturated groups is difficult to obtain with less than four carbon atoms in the structure. On the other hand, where the olefin moiety contains more than about 10 carbon atoms, reduced activity often is noted even though pi complexes can be formed. Generally, the olefins are dienes, but longer chain compounds forming triene unsaturation can also be used for forming the pi olefin complex. In formula 1, R and R' can be alike but they need not be similar olefins. For example, R can by a cyclopentadiene ring and R' a phenyl group. Aliphatic olefins for making pi olefin complexes include: butadiene, isoprene, 1,3-pentadiene, 1,3-hexadiene, 1,3-octadiene, and so forth. Cycloolefin compounds suitable for making the pi olefin complex are those having five and six carbon atoms in the ring and include: cyclopentadiene, and aromatic moieties, such as benzene, mesitylene, and toluene. Cycloaliphatic olefins include cyclooctadiene, cyclobutadiene, cyclohexadiene, cycloheptadiene, cycloheptatriene, cyclooctatriene, cyclododectatriene, and so forth. Substituent groups can be pendant from the olefin used in making the pi olefin complexes. Examples of such groups are halogen, lower alkyl ester, lower alkyl ether, ketones, and so forth.

Metal pi olefin complexes contemplated as a component for making the photosensitive catalyst of this invention includes the following: dicyclopentadienyl cobalt, dicyclopentadienyl chromium, dicyclopentadienyl manganese, dicyclopentadienyl titanium, dicyclopentadienyl nickel, dicyclopentadienyl ruthenium, dicyclopentadienyl vanadium, and others. Aromatic metal pi olefin complexes are bis-benzene chromium, bis-benzene titanium, bis-benzene nickel, bis-benzene vanadium, bis-benzene manganese and others of the transition metals.

Correspondingly, where R and R' are unlike each other, there can be cyclopentadienyl benzene chromium, cyclopentadiene-mesitylene nickel, cyclopentadiene benzene cobalt, and other similar metal pi olefin complexes of the transition metals. Substituted derivatives of the metal pi olefin complex as designated by formula 1 include: vinyl dicyclopentadienyl nickel, vinyl cyclopentadienyl benzene chromium, vinyl bis-benzene cobalt, and others; acetyl dicyclopentadienyl nickel, titanium, and vanadium; tertiary amyl cyclopentadienyl benzene, chromium, vanadium, and so forth, tertiary butyl dicyclopentadienyl vanadium, cobalt, and chromium, benzyl dicyclopentadienyl manganese, vanadium, chromium, and cobalt, chlorocarbonyl dicyclopentadienyl nickel, chromium, and titanium, 1,1-diacetyl bis-phenyl chromium, cobalt, 1,1-diacetyl dicyclopentadienyl chromium, dicyclopentadienyl chromium carboxylic acid, dicyclopentadienyl manganese dicarboxylic acid, α-hydroxy cyclopentadienyl phenyl chromium, cobalt, manganese, and nickel, dihydroxy cyclopentadienyl phenyl chromium, manganese, cyclopentadienyl mesitylene, 1,1-diacetyl chromium, vanadium, acrylato dicyclopentadienyl chromium, nickel, manganese, acrylato cyclopentadienyl phenyl manganese, vanadium, nickel, cobalt, chromium, and so forth.

Metal pi complexes of the carbonyl type as are shown by formula 2 are similar to the pi olefin metal complexes, except that carbonyl groups are used in place of R'. Examples of metal cycloalkadienyl carbonyls include: toluene chromium tricarbonyl, mesitylene chromium tricarbonyl, cyclopentadienyl cobalt dicarbonyl, cyclopentadienyl manganese tricarbonyl, the alkyl cyclopentadienyl manganese tricarbonyls, such as methyl cyclopentadienyl manganese tricarbonyl, cyclopentadienyl molybdenum tricarbonyl dimer, bicyclohepta 2,5-dienemolybdenum tetracarbonyl, mesitylene tricarbonyl, methyl cyclopentadienyl molybdenum tricarbonyl dimer, cycloheptatriene molybdenum tricarbonyl, cyclopentadienyl vanadium carbonyl, and para-xylene chromium tricarbonyl, benzene chromium tricarbonyl, and chlorocarbonyl bis-(triphenyl phosphine) iridium.

In naming specific compounds contemplated within the scope of formulas 1 and 2, it is not meant to list all of them which are known but those which are representative of that class of compounds and some of which are available on a commercial basis.

The metal pi olefin compounds which can be used for practicing this invention can be compounded with the activated halogenated compound in a variety of ways and be present in a variety of forms. One form is by simple addition of the compound itself. By this it is meant the metal pi olefin compound or metal pi olefin with substituted groups thereon compounded with the activated halogenated compound can be used as a catalyst. The metal pi olefin can also be in another form; e.g., a monomer having an ethylenically unsaturated group therein for polymerization with vinyl monomer. An example of such unsaturation is an acrylato functional group or vinyl group. Another form is to polymerize the monomer described above with vinyl monomer forming a polymer and using the polymer in combination with the activated halogenated compound as the photosensitive catalyst. Another form of the metallocene compound is a polymer such as a polyester derived by reacting a carboxylic or hydroxyl derivative of a metallocene with appropriate polyhydric alcohols or polycarboxylic acid to form polyesters. Each of the above methods can be used for making the photosensitive catalyst. The only requirement is that the level of metallocene compound be present in prescribed ranges with the activated halogenated compound. chloride, naphthaquinone sulfonyl chloride, phenanthraquinone sulfonyl chloride, benzenthraquinone sulfonyl chloride, phanthranene quinone sulfonyl chloride, methylnapthylquinone sulfonyl chloride, nitroanthraquinone sulfonyl chloride, acetamido phenanthraquinone sulfonyl chloride; the ketone-activated polynuclear quinones, such as a methyl ketone anthraquinone sulfonyl chloride. Acylated polynuclear quinone sulfonyl chlorides wherein the acylated groups are esters and ethers substituent from the polynuclear group, and so forth can also be used.

Heterocyclic sulfonyl chlorides include the 5- and 6-membered heterocyclic compounds containing a nitrogen, oxygen, or sulfur atom. Additionally, they can be polynuclear heterocyclic compositions where the rings are fused. Examples of such heterocyclic sulfonyl halides are pyridine sulfonyl chloride, piperidine sulfonyl chloride, furan sulfonyl chloride, benzofuran sulfonyl chloride; the thiophene sulfonyl chlorides, such as benzothiophene sulfonyl chloride, xanthan sulfonyl chloride, and so forth.

Additionally, the aromatic and polynuclear radicals of the heterocyclic 5- and 6-membered rings containing the nitrogen, oxygen, and sulfur atom can also be substituted with alkyl groups; e.g., esters, ketones, amide groups, acetamide groups, and so forth.

Examples of other halosulfonyl compositions typically used as photopolymerization catalysts are found in U. S. Pat. Nos. 3,113,024 and 2,579,095 and such halosulfonyl compounds are incorporated by reference.

It should be noted from the examples of the above that most of the sulfonyl chlorides are activated by a group alpha-positioned from the sulfonyl chloride grouping. An activating group such as an aromatic radical, acyl group, and so forth are common. Aliphatic sulfonyl chlorides, with the exception of a methane or ethane group, generally are not adapted for making desirable photopolymerization catalysts with the sulfonyl chlorides, as the aliphatic portion tends to deactivate the grouping.

Halosubstituted naphthalene compositions which are activated and can be used in practicing the invention are those commonly used as a photosensitizer in the polymerization of vinyl monomers with ultraviolet light. Such compositions are known, and examples of same are shown in U. S. Pat. No. 2,505,068. These compositions are to be incorporated by reference. Examples of halosubstituted naphthalene include β-chloromethyl naphthalene, α-chloromethyl naphthalene, 1,4-dichloromethyl naphthalene, 1,5-dichloromethyl naphthalene, the beta-substituted analogs thereof; e.g., 2,3-dichloromethyl naphthalene, 2,6-dichloromethyl naphthalene, and so forth. It is to be understood that the iodo and bromo analogs of the halosubstituted naphthalenes can also be utilized in place of the chloronaphthalene. For reasons of efficiency and economy, the chlorosubstituted naphthalenes are preferred for practicing this invention.

As mentioned in the broad description of the invention, alpha-activated acyl halogenated compounds and acid halides can be used for practicing the invention. These compounds can be described by the generic formula:

wherein R is an aromatic, aliphatic, alkylene radical, or substituted radical thereof; and X is a halogen atom or halogenated methyl radical. By "substituted radical" it is meant to refer to radicals having groups pendant therefrom; e.g., alkyl, ester, ether, amide, nitro, amine, and aldehyde groups. Generally, the substituent group pendant from the aromatic, aliphatic, alkylene radical, does not have more than four carbon atoms. In referring to the formula, the aliphatic radical substituent from the carbonyl group should be lower alkyl having from one to six carbon atoms. Such alkyl groups include methyl, ethyl, propyl, butyl, and so forth. Aromatic groups substituent from the carbonyl group are most often employed and such aromatic groups would include polynuclear groups. Alkyl radicals are those having aliphatic radicals having unsaturation therein, and usually not containing more than six carbon atoms. Preferably, acrylato functional alkenyl groups are used; e.g., those having the linking $CH_2=CH-$ pendant from the carbonyl group. Examples of compounds falling within the generic formula above include: phenacyl chloride, ethyl and chloromethyl ketone, chloroacetone, ethylchloroacetate, acetyl chloride, allyl chloroformate, chloroacetyl chloride, and so forth. Examples of compositions falling within the generic formula are also given in U. S. Pat. No. 2,548,685 and are incorporated by reference.

As mentioned before, allylic activated halogenated compounds can be used in practicing the invention. The generic formula of the allylic activated halogenated compounds can be described as follows:

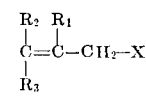

wherein $R_1$ is hydrogen, a lower alkyl group, or phenyl group; $R_2$ and $R_3$ are like or unlike, and can be hydrogen, alkyl, aromatic, or polynuclear groups provided that they are not polynuclear at the same time. The key feature to such compositions is the allylic activation of the halogen atom in the compositions. It appears that the substituent groups pendant from the allylic carbon atoms have little affect on the effectiveness of the catalyst system for UV polymerization. Generally, and for reasons of efficiency and economy, the R groups e.g., $R_1$, $R_2$, and $R_3$ are hydrogen, lower alkyl; that is, having from 1 to 4 carbon atoms or aromatic with only one of the R groups being aromatic for a given composition. Examples of such allylic activated compounds include 1,1-diphenyl-3-chloro-1-propene, 3-chloro-2-propene, 1,1-diethyl-3-chloro-2-propene, 1-acetyl-3-chloro-2-propene, and 1-amido-3-chloro-2-propene.

The vinyl monomers useful in practicing the invention are those which have been used heretofore in photopolymerization. Typically, these vinyl monomers are readily polymerizable with a redox catalyst system. These vinyl monomers generally are activated by another group such as an unsaturated group, a carbonyl group, a halogen atom, and so forth. One class of vinyl monomers particularly adapted for photopolymerization are the lower alkyl esters of acrylic and methacrylic acid, the alkyl portion having from one to six carbon atoms. Examples of such alkyl esters include: methylmethacrylate, ethylmethacrylate, 2-ethylhexyl methacrylate, butylacrylate, isobutyl methacrylate, the corresponding hydroxy acrylates; e.g., hydroxy ethylacrylate, hydroxy propyl acrylate, hydroxy ethylhexyl acrylate, also the glycol acrylates; e.g., ethylene glycol dimethacrylate, hexamethylene glycol dimethacrylate, the allyl acrylates; e.g., allyl methacrylate, diallyl methacrylate, methallyl methacrylate; the epoxy acrylates; e.g., glycidyl methacrylate; and the aminoplast acrylates; e.g., melamine acrylate.

Other classes of vinyl monomers are vinyl acetate, vinyl and vinylidine halides; e.g., vinyl chloride, vinylidine chloride, amides; e.g., methacrylamide, acrylamide, diacetone acrylamide, butadiene, styrene, vinyl toluene, and so forth.

Another class of unsaturated compounds which can be photopolymerized by using the catalyst of this invention and is, therefore included in the term "vinyl monomers" are unsaturated polyesters capable of being crosslinked with styrene. Crosslinkable unsaturated polyesters are widely known and reported in the art. Typically, they are derived by the reaction of a polyhydric alcohol and an $\alpha,\beta$-unsaturated dicarboxylic acid or anhydride thereof. Examples of polyhydric alcohols suitable for making this class of polyesters include: glycerin, propylene glycol, hexanediol, glycerol, pentaerythritol, trimethylolpropane, glycol ethers, and so forth. Examples of $\alpha,\beta$-unsaturated dicarboxylic acids or their anhydride counterparts which are also useful in making the polyester include: maleic, fumaric, itaconic, and citraconic.

In the polymerization process of vinyl monomers, a beam of wave energy is used to induce breakdown of the photosensitive catalyst thereby creating free radicals. Preferably, the wave energy is supplied by ultraviolet light; that is, light having a wave length of from about 1,500–4,000 Angstroms. Sunlight is a good source of such light.

The photosensitive photopolymerization catalyst of this invention is included in the vinyl monomer in a proportion of about 1 to 10 percent by weight of the vinyl monomer. The level of photosensitive catalyst used typically corresponds to the level commonly used with the activated halogenated composition in the polymerization of vinyl monomers. When the level of photosensitive catalyst falls below about 1 percent by weight of the vinyl monomer, the polymerization rate tends to fall off substantially. Levels of catalyst above about 10 percent often do not significantly enhance the rate of polymerization of the vinyl monomer to justify such high levels and sometimes affect the coloration of the cured polymer. For reasons of efficiency and economy, the preferred level of catalyst used in the polymerization of vinyl monomers is from about 1-½ to 3 percent by weight of the vinyl monomer.

The photosensitive photopolymerization catalyst of this invention comprises from about 0.01 to 50 percent by weight of metallocene compound to activated halogenated compound. As stated, only a minor proportion of metallocene compound need be present and in contact with the activated halogenated compound to effect a reaction therewith and synergize the catalyst for enhancing the rate of polymerization of the vinyl monomer. Levels of metallene compound above 50 percent by weight of the halogenated compound often afford no practical advantages and sometimes often cause discoloration of the cured polymer due to the presence of metal. For reasons of efficiency and economy, the level of metallocene compound to activated halogenated compound is from about 1 to 5 percent by weight; that is, the catalyst would comprise from about one to five parts metallocene compound and about 95 to 99 parts activated halogenated compound. Levels from 1 to 5 percent by weight metallocene compound ostensibly provide faster polymerization rates than at the 0.01 percent level and yet do not significantly affect the coloration of the resulting polymer formed. For these reasons, such range is preferred.

Other photosensitive polymerization catalysts can also be included with the photosensitive catalyst of this invention. However, no significant advantages have been noted by the incorporation of other catalytic systems. The photopolymerization catalyst system used in initiating free radical formation of vinyl monomers in the presence of ultraviolet light should contain at least 50 percent of the invented catalyst system disclosed herein. Preferably, all of the photopolymerization catalyst used for sensitizing the monomer is the invented catalyst system. Examples of other photosensitive catalysts which can be included as a portion of the photosensitive catalyst include the polynuclear quinones, mercaptans, such as aryl mercaptans, triphenyl phosphine, benzophenone, cobalt, nickel, iron salts, and so forth.

A particular advantage of this catalyst system; i.e., the metallocene compound in activated halogenated compound is that it can be used with both pigmented and unpigmented monomer systems. It is noted that very good "clears" are produced without visible discoloration. Such inorganic and organic pigments suitable as colorants for polymers are well known to those skilled in the art, and examples of same are described in other references.

The following examples are provided to illustrate preferred embodiments of the invention, and are not intended to restrict the scope thereof. All parts are parts by weight, and all percentages are weight percentages. All temperatures are in degrees Fahrenheit.

EXAMPLE I

A photosensitive catalyst system is prepared by dissolving 2.0 grams of an 8 percent solution of cobaltocene (dicyclopentadienyl cobalt) and diethyl benzene in 10 grams of benzene sulfonyl chloride. The benzene sulfonyl chloride changes color on addition of the cobaltocene solution to a greenish-blackish color. 98 parts of a vinyl monomer containing 50 parts hydroxyethyl acrylate and 50 parts melamine acrylate are mixed with 2 parts of the photosensitive cobaltocene catalyst until the catalyst is thoroughly blended in the vinyl monomer. A portion of the resultant sensitized vinyl monomer, then is placed on a glass slide and drawn down with a bar forming a liquid film having a thickness of approximately 3 mils. The glass slide then is placed about 5 inches from an ultraviolet lamp source. The lamp is one manufactured by the General Electric Co., and its model number is H14T3. The lamp has an input wattage of about 850 watts, and an output wattage of 255 watts; 28 watts in the far UV section, 68 with 10 parts anthraquinone sulfonyl chloride until the dicyclopentadienyl nickel is substantially homogeneously blended therein. Three parts of the catalyst then are mixed with 97 parts of a monomer containing 70 parts N-vinyl pyrolidone and 30 parts vinyl acetate. The resultant sensitized monomer is placed in a soft, glass vial and capped. Polymerization occurs on subjecting the vial and contents therein to irradiation from the ultraviolet lamp described in Example I. After a period of about 20 minutes, the polymerization is completed and a hard, solid polymer body is formed.

EXAMPLE VIII

Preparation of a catalyst is prepared by mixing 0.5 parts cobaltocene with 10 parts triethyl amine until the cobaltocene is blended in the amine. Five parts of the resultant catalyst then is mixed with 95 parts of a monomer containing 50 parts of melamine methacrylate and 50 parts ethylhexyl acrylate. The sensitized monomer is spread over a glass slide and drawn down to form a film of about 3 mils thickness. On irradiation of the monomer on the glass slide with the ultraviolet lamp described in Example I at a distance of 5 inches, it is observed that very little polymerization occurs even after a period of about 15 minutes. There is some gelation of the monomer indicating polymerization, however, it is highly tacky to the touch indicating that complete polymerization did not occur in the 15-minute period.

When 0.5 parts cobaltocene with 10 parts carbon tetrabromide is prepared in like manner as the above sample and mixed with the same monomer and in the same proportion; i.e., 5 parts catalyst per 95 parts monomer and then spread over a glass slide, drawn down, and subsequently irradiated. No significant polymerization occurs even after a period of 15 minutes. The monomer remained tacky to the touch.

EXAMPLE IX

A photosensitive polymerization catalyst is prepared by mixing 0.2 parts dicyclopentadienyl tin with 10 parts of allyl chloroformate. One part of the resultant photosensitive catalyst then is mixed with 99 parts of styrene until the catalyst is thoroughly blended therein. The sensitized monomer solution is placed in a glass vial and drawn down forming a film of about 2 mils thickness. On subjecting the glass slide and monomer thereon to ultraviolet irradiation supplied by the lamp described in Example I, polymerization occurs in about 15 minutes resulting in a formation of a hard body.

EXAMPLE X

A photosensitive polymerization catalyst is prepared by mixing 50 parts of cyclopentadienyl molybdenum tricarbonyl and 50 parts anthraquinone sulfonyl chloride until the molybdenum compound is substantially homogeneously mixed therein. 20 parts of the resultant photosensitive catalyst then is mixed with 80 parts of a vinyl monomer containing 50 parts hydroxyethyl acrylate and 50 parts melamine acrylate. The photosensitive catalyst appears to be substantially soluble in the vinyl monomer and is dissolved therein. The resultant sensitized monomer is spread over a glass slide and drawn down with a bar forming a film of about 3 mils thickness. The glass slide then is placed about 5 inches from the ultraviolet lamp described in Example I and irradiated. After a period of about 10 minutes, polymerization is complete and the film on the glass slide is hard, exhibiting substantially no tackiness to the touch. Slight discoloration is noted in the film and this is presumably due to the presence of the large amount of molybdenum in the film.

EXAMPLE XI

Preparation of a photosensitive polymerization catalyst is prepared by mixing 0.1 parts dicyclopentadienyl cobalt with 100 parts phenacyl chloride until the cobalt is mixed therein. One part of the resultant photosensitive catalyst then is mixed with 99 parts melamine acrylate and styrene in a 50:50 ratio. The sensitized monomer is spread over a glass slide and drawn down with a bar forming a liquid film of about 3 mils thickness. The glass slide then is placed about 5 inches from the ultraviolet lamp described in Example I. On irradiation, after a period of about 15 minutes, substantial polymerization occurs, however, the surface was slightly tacky to the touch indicating incomplete polymerization. It is believed that the slower polymerization rate from the other examples is caused by the employment of a lower percentage of metallocene compound in the photosensitive catalyst and the small amount of catalyst used basis vinyl monomer. But, the polymerization rates are faster than when using phenacyl chloride alone as the sensitizer and substantially faster than using dicyclopentadienyl cobalt alone.

EXAMPLE XII

A photosensitive catalyst system is prepared by mixing 0.2 parts bis-benzene chromium with 10 parts benzene sulfonyl chloride until thoroughly mixed. Then 98 parts of methyl methacrylate are combined with 2 parts of the above photosensitive catalyst and mixed forming a sensitized sample. The sample then is placed in a soft glass vial and the vial placed about 5 inches from the lamp source described in Example I. After a period of approximately 10 minutes, irradiation from the light source, the methyl methacrylate polymerizes to a hard, solid body. On examination of the polymer, no substantial discoloration is noted, as the polymer is substantially clear.

EXAMPLE XIII

A photosensitive catalyst system is prepared by mixing 0.2 parts cyclopentadienyl benzene vanadium with 10 parts benzene sulfonyl chloride until thoroughly mixed. Then 98 parts of methyl methacrylate are combined with 2 parts of the above photosensitive catalyst and mixed forming a sensitized sample. The sample then is placed in a soft glass vial and the vial placed about 5 inches from the lamp source described in Example I. After a period of approximately 10 minutes irradiation from the light source, the methyl methacrylate polymerizes to a hard, solid body. On examination of the polymer, no substantial discoloration is noted, as the polymer is substantially clear.

watts in the middle UV section, 52 watts in the near UV section, and about 107 watts in the visible section. The vinyl monomer on being subjected to ultraviolet radiation from the lamp source, polymerizes in about 10 minutes to form a hard film.

Ninety-eight parts of the vinyl monomer system recited above containing 50 parts melamine acrylate and 50 parts hydroxyethyl acrylate is sensitized with 2.0 parts of the same cobaltocene solution excluding the benzene sulfonyl chloride. The sample subsequently is poured onto a glass slide, drawn down, and irradiated with ultraviolet light in like manner as the earlier sample. It is noted no significant polymerization occurs even after a period of about 30 minutes irradiation. The vinyl monomer film on the glass slide remains in substantially liquid form with only a slight amount of polymerization having taken place.

When 98 parts of the vinyl monomer system recited above are sensitized with 2 parts benzene sulfonyl chloride and the resultant solution applied to a glass slide and irradiated in like manner as the above samples, no significant reaction takes place even after a period of about 30 minutes. The film on the glass slide is somewhat tacky indicating that a higher degree of polymerization has taken place than when using the cobaltocene solution alone, but the film is not as hard as the vinyl monomer film sensitized with the cobaltocene-benzene sulfonyl chloride catalyst.

EXAMPLE II

A photosensitive catalyst system is prepared by mixing 0.2 parts dicyclopentadienyl titanium dichloride with 10 parts benzene sulfonyl chloride until thoroughly mixed. Then 98 parts of methyl methacrylate are combined with 2 parts of the above photosensitive catalyst and mixed forming a sensitized sample. The sample then is placed in a soft glass vial and the vial placed about 5 inches from the lamp source described in Example I. After a period of approximately 10 minutes irradiation from the light source, the methyl methacrylate polymerizes to a hard, solid body. On examination of the polymer, no substantial discoloration is noted, as the polymer is substantially clear.

EXAMPLE III

A photosensitive catalyst system is prepared by mixing 10 parts α-chloronaphthalene and 0.2 parts cobaltocene until thoroughly blended. A color change occurs during mixing, the resultant color of the mixture being a greenish-blackish color. Two parts of this photosensitive catalyst are mixed with 98 parts of a vinyl monomer containing 50 parts hydroxy ethylacrylate and 50 parts melamine acrylate. The resultant photosensitized sample then is spread as a film over a glass slide and irradiated with ultraviolet light as in like manner as the sample in Example I. The sample polymerizes to a hard, solid film having substantially no tackiness in a period of about 10 minutes time.

EXAMPLE IV

A photosensitive catalyst is prepared by dissolving 0.2 grams of methylcyclopentadienyl manganese tricarbonyl in 10 grams of benzenesulfonyl chloride. On mixing, a color change is noted, the color changing from a light brown to an almost black. Presumably, a manganese complex or salt is formed on contact with the sulfonyl chloride. Two parts of the photosensitive catalyst then are mixed with 98 parts of methyl methacrylate and a resulting sample then placed in a small glass vial in like manner as in Example I. On irradiation of the sample with the lamp source described in Example I, at a distance of about 5 inches from the lamp, a hard film was produced in about 10 minutes.

A photosensitized vinyl monomer system of 98 parts methyl methacrylate having 2 parts benzene sulfonyl chloride when drawn down in a small glass vial in like manner as the above-referred to sample and subjected to irradiation with the same ultraviolet light and at an identical distance, and no significant polymerization or film formation is noted after a period of 10 minutes.

A photosensitive catalyst system of 2 parts dicyclopentadienyl manganese tricarbonyl is mixed with 98 parts of methyl methacrylate. The sensitized monomer is placed in a small glass vial in like manner as the above two samples and irradiated with the same light source at a substantially identical distance. Substantially no polymerization occurs after 10 minutes irradiation. Even with irradiation continued for another 10 minutes, no significant polymerization is noted.

EXAMPLE V

A photosensitive catalyst is prepared by mixing 0.5 parts vinyl dicyclopentadienyl chromium and 10 parts phenacyl chloride. A color change is noted on mixing, the resultant color being a sort of reddish-black. Four parts of the photosensitive catalyst then are mixed with 96 parts of 2-ethyl hexyl acrylate until the catalyst is thoroughly blended therein. The resultant sensitized monomer then is poured into a soft glass vial and capped and the vial irradiated with the ultraviolet light described in Example I. The distance from the source is about 5 inches. In a period of about 30 minutes the monomer cures to a hard, solid body.

EXAMPLE VI

A cobalt sensitized crosslinkable polyester is prepared by reacting cobaltocene dicarboxylic acid, maleic anhydride, and pentaerythritol in conventional manner to form a polyester. The resultant polyester contains 20 percent by weight cobaltocene dicarboxylic acid, 50 percent maleic acid units, and 30 percent pentaerythritol. 0.5 parts of the cobaltocene sensitized polyester then are mixed with 10 parts benzene sulfonyl chloride to form a photopolymerization catalyst. Four parts of the catalyst then are blended with 96 parts of a vinyl monomer containing 50 parts hydroxy ethylacrylate and 50 parts melamine acrylate. The resultant photosensitized monomer is applied to a glass slide and drawn down with a bar to form a film of about 3 mils thickness. On irradiation with the ultraviolet light source described in Example I at a distance of 5 inches, polymerization of the monomer occurs and produces a hard film after about 10 minutes.

EXAMPLE VII

A nickel-based photopolymerization catalyst is prepared by mixing one part dicyclopentadienyl nickel

EXAMPLE XIV

A photosensitive catalyst system is prepared by mixing 0.2 parts toluene chromium tricarbonyl with 10 parts benzene sulfonyl chloride until thoroughly mixed. Then 98 parts of methyl methacrylate are combined with 2 parts of the above photosensitive catalyst and mixed forming a sensitized sample. The sample then is placed in a soft glass vial and the vial placed about 5 inches from the lamp source described in Example I. After a period of approximately 10 minutes irradiation from the light source, the methyl methacrylate polymerizes to a hard, solid body. On examination of the polymer, no substantial discoloration is noted, as the polymer is substantially clear.

What is claimed is:

1. In a process for polymerizing a vinyl monomer in the presence of a photoinitiator by irradiating said monomer with a beam of wave energy, the improvement for enhancing the rate of polymerization of said monomer which comprises using as a major proportion of said photoinitiator, a synergistic photosensitizer comprising an activated halogenated compound selected from the group consisting of a halosulfonyl compound, an α,β-halosubstituted naphthalene, an allylic activated halogenated compound, and an α-acyl activated halogenated compound and a metallocene compound and mixtures thereof represented by the formulas:

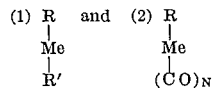

wherein Me is a transition metal as set forth in Groups Ib, IIb, IVb, Vb, VIb, VIIb, and VIIIb having an atomic number of between 22 and 79, excluding 26; R and R' are olefins having conjugated unsaturation and from four to 10 carbon atoms in the structure and N is a number from one to four to satisfy available valence bonds, said metallocene compound being present in said synergistic photosensitizer in a proportion of from about 0.01 to 50 percent by weight based on the halogenated compound.

2. The process of claim 1 wherein said beam of wave energy is provided by ultraviolet light.

3. The process of claim 1 wherein said photoinitiator is present in a proportion of from 1 to 10 percent of said vinyl monomer.

4. The process of claim 3 wherein said metallocene compound is present in a proportion of from about 1 to 5 percent by weight of said activated halogenated compound.

5. The process of claim 4 wherein said activated halogenated compound is an organosulfonyl chloride selected from the group consisting of aryl, polynuclear, polynuclear quinone sulfonyl chlorides, and substituted derivatives thereof.

6. The process of claim 5 wherein said metallocene compound is represented by the formula:

7. The process of claim 6 wherein said R in said metallocene compound is a cyclopentadienyl radical.

8. The process of claim 6 wherein said metallocene compound is present in a polyester.

9. The process of claim 6 wherein said metallocene compound is present in a polymer.

10. The process of claim 6 wherein said metallocene compound is dicyclopentadienyl metal.

11. The process of claim 10 wherein said dicyclopentadiene metal is dicyclopentadienyl cobalt.

12. The process of claim 10 wherein said dicyclopentadiene metal is dicyclopentadienyl chromium.

13. The process of claim 10 wherein said dicyclopentadiene metal is dicyclopentadienyl nickel.

14. The process of claim 9 wherein said R group is a phenyl group.

15. The process of claim 14 wherein said metallocene compound is bis-benzene chromium.

16. The process of claim 13 wherein said metallocene compound is bis-benzene nickel.

17. The process of claim 13 wherein said metallocene compound is bis-benzene cobalt.

18. The process of claim 5 wherein said metallocene compound is represented by the formula:

19. The process of claim 18 wherein said R group in said metallocene compound is a cyclopentadienyl radical.

20. The process of claim 18 wherein said metallocene compound is cyclopentadienyl manganese tricarbonyl.

21. The process of claim 18 wherein said metallocene compound is methyl cyclopentadienyl manganese tricarbonyl.

22. The process of claim 18 wherein said metallocene compound is cyclopentadienyl cobalt dicarbonyl.

23. The process of claim 18 wherein said metallocene compound is toluene chromium tricarbonyl.

* * * * *